(12) United States Patent
Khachatryan et al.

(10) Patent No.: US 9,555,561 B2
(45) Date of Patent: Jan. 31, 2017

(54) METHOD OF MANUFACTURING A POLYIMIDE SUBSTRATE AND METHOD OF MANUFACTURING A DISPLAY DEVICE USING THE SAME

(71) Applicant: SAMSUNG DISPLAY CO., LTD., Yongin, Gyeonggi-Do (KR)

(72) Inventors: Hayk Khachatryan, Hwaseong-si (KR); Hyunwoo Koo, Hwaseong-si (KR); Sunho Kim, Seongnam-si (KR); Taewoong Kim, Yongin-si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 417 days.

(21) Appl. No.: 14/189,251

(22) Filed: Feb. 25, 2014

(65) Prior Publication Data

US 2015/0076720 A1   Mar. 19, 2015

(30) Foreign Application Priority Data

Sep. 16, 2013 (KR) ........................ 10-2013-0111388

(51) Int. Cl.
| | | |
|---|---|---|
| *B29C 41/00* | (2006.01) | |
| *B29C 41/02* | (2006.01) | |
| *B29L 9/00* | (2006.01) | |
| *B29L 11/00* | (2006.01) | |
| *B29K 79/00* | (2006.01) | |

(52) U.S. Cl.
CPC .......... *B29C 41/003* (2013.01); *B29C 41/02* (2013.01); *B29K 2079/08* (2013.01); *B29L 2009/00* (2013.01); *B29L 2011/00* (2013.01)

(58) Field of Classification Search
IPC ............... B29C 41/003,41/02; B29L 2009/00, 2011/00; B29K 2079/08
See application file for complete search history.

(56) References Cited

U.S. PATENT DOCUMENTS

| | | | |
|---|---|---|---|
| 5,232,860 | A | 8/1993 | Kawanishi et al. |
| 5,261,977 | A | 11/1993 | Powell |
| 5,262,347 | A | 11/1993 | Sands |
| 5,665,802 | A | 9/1997 | Maki et al. |

(Continued)

FOREIGN PATENT DOCUMENTS

| | | |
|---|---|---|
| KR | 1020050052830 | 6/2005 |
| KR | 1020090017014 | 2/2009 |
| KR | 1020120100274 | 9/2012 |

OTHER PUBLICATIONS

Jesmin Haq et al., "Temporary bond-debond technology for high-performance transistors on flexible substrates", Journal of the SID, 18/11, 2010, pp. 884-891.

(Continued)

*Primary Examiner* — Mathieu Vargot
(74) *Attorney, Agent, or Firm* — F. Chau & Associates, LLC

(57) ABSTRACT

Provided is a method of manufacturing a polyimide substrate. An acid solution is provided to a glass substrate to remove a first cation included in the glass substrate, and a source solution including polyamic acid is provided to the glass substrate. Then, the polyamic acid is cured to form a polyimide substrate on the glass substrate, and the polyimide substrate is separated from the glass substrate.

20 Claims, 8 Drawing Sheets

(56) References Cited

U.S. PATENT DOCUMENTS

| | | | |
|---|---|---|---|
| 5,741,596 A * | 4/1998 | Skowronski | C23C 28/04 |
| | | | 419/12 |
| 6,071,795 A | 6/2000 | Cheung et al. | |
| 7,842,547 B2 | 11/2010 | Shelton et al. | |
| 8,216,876 B2 | 7/2012 | Yasumatsu | |
| 2004/0060476 A1* | 4/2004 | Sirejacob | C03C 17/30 |
| | | | 106/287.1 |
| 2007/0091062 A1* | 4/2007 | French | G02F 1/133305 |
| | | | 345/107 |
| 2008/0113460 A1 | 5/2008 | Shelton et al. | |
| 2011/0009511 A1* | 1/2011 | Hill | A61K 6/0835 |
| | | | 521/92 |
| 2011/0124183 A1 | 5/2011 | Yasumatsu | |
| 2012/0285627 A1 | 11/2012 | Scatena et al. | |
| 2013/0048224 A1 | 2/2013 | George et al. | |
| 2013/0184406 A1* | 7/2013 | Miyazaki | C08G 73/1042 |
| | | | 524/600 |

OTHER PUBLICATIONS

Mark Stewart, et al., "Polysilicon TFT Technology for Active Matrix OLED Displays", IEEE Transactions on Electron Devices, vol. 48, No. 5, May 2001, pp. 845-851.

Yun Sung Woo, et al., "Solid-phase epitaxy of amorphous Si using single-crystalline Si nanowire seed templates", Applied Physics Letters 91, 223107 (2007).

J.W. Hamer, et al., "69.4: Invited Paper: Mass Production of Full-Color AMOLED Displays", SID Dig. 2005; 36: 1902-1907.

Hyun Soo Shin et al., "54.4: 4.1 Inch Top-Emission AMOLED on Flexible Metal Foil", SID Dig. 2005; 36: 1642-1645.

Andreas Weber, et al., "6.3: Thin Glass-Polymer Systems as Flexible Substrates for Displays", SID Dig. 2002; 33: 53-55.

Morten M. Smedskjaer, et al., "Modifying glass surfaces via internal diffusion", Journal of Non-Crystalline Solids 356 (2010) 290-298.

Ian French et al., "58.4: Invited Paper: Flexible Displays and Electronics Made in AM-LCD Facilities by the EPLaR Process", SID 07 Digest, pp. 1680-1683.

Anton Georgiev et al., "Preparation of Polyimide Thin Films by Vapour Deposition and Solid State Reactions", www.intechopen.com; pp. 71-93 , Apr. 2010.

T. Takekoshi et al., "Polymides—Fundamentals and Applications, Ed. Gosh, M.K. and Mittal, K.L., Marcel Dekker, New York, Chapter 1—Polymides: chemistry & structure-property relationships—literature review", New York, 1996.

M. Abadie, et al., "Polymides and Other High Temperature Polymers", Elsevier: 1991.

Anu Stell Mathews, et al., "Synthesis, Characterization, and Properties of Fully Aliphatec Polyimides and Their Derivatives for Microelectronics and Optoelectronics Applications", Macromolecular Research, vol. 15, No. 2, pp. 114-128 (2007).

Satoshi Inoue, et al., "Surface-Free Technology by Laser Annealing (SUFTLA) and Its Application to Poly-Si TFT-LCDs on Plastic Film With Integrated Drivers", IEEE Transactions on Electron Devices, vol. 49, No. 8, Aug. 2002, 1353-60.

L. Pereira et al., "Nickel-assisted metal-induced crystallization of silicon: Effect of native silicon oxide layer", Thin Solid Films 511-512 (2006) 275-279.

Akihiko Asano, et al., "28.2: A Plastic 3.8-in. Low-Temperature Polycrystalline Silicon TFT Color LCD Panel", SID Symposium Digest of Technical Papers, 34: 988-991. doi: 10.1832451, (2003).

Myeon-Cheon Choi et al., "Polymers for flexible displays: From material selection to device applications", Prog. Polym. Sci. 33 (2008) 581-530.

Kazushige Takechi et al., "Very High Rate and Uniform Glass Etching with HF/HCI Spray for Transferring Thin-Film Transistor Arrays to Flexible Solutions", Japanese Journal of Applied Physics, vol. 45, No. 7, 2006, pp. 6008-6010.

D. Wilson et al., "Chapter 3—Semi-Flexible Semicrystalline Polyimides—Literature Review", New York: Chapman and Hall, 1990; pp. 80-101.

P. Hill et al., "iSuppli flexible displays report", Veritas et Visus, Flex Substrate, Nov. 2010; vol. 6 No. 5.

* cited by examiner

METHOD OF MANUFACTURING A POLYIMIDE SUBSTRATE AND METHOD OF MANUFACTURING A DISPLAY DEVICE USING THE SAME

CROSS-REFERENCE TO RELATED APPLICATIONS

This application claims priority under 35 U.S.C. §119 to Korean Patent Application No. 10-2013-0111388, filed on Sep. 16, 2013, the entire disclosure of which is hereby incorporated by reference herein in its entirety.

The present disclosure relates to a method of manufacturing a polyimide substrate and a method of manufacturing a display device using the same, and more particularly, to a method of manufacturing a polyimide substrate, by which a polyimide substrate is formed on a glass substrate and a method of manufacturing a display device using the same.

A flexible display device including a flexible substrate having flexible properties is under development among display devices. The flexible display device may be bent flexibly according to the need of a user to increase the portability and convenience of the display device when used. The flexible substrate may include, for example, a plastic substrate and a metal substrate having a thin film shape. A polyimide substrate having good heat-resistance is generally used as the plastic substrate.

When a flexible display device is manufactured using the flexible substrate, the flexible substrate is disposed on a carrier substrate such as, for example, a glass substrate for securing the planarity of the flexible substrate. Then, various manufacturing processes are performed with respect to the flexible substrate, and pixels are formed on the flexible substrate. The flexible substrate including the pixels formed thereon is separated from the carrier substrate.

SUMMARY

Exemplary embodiments of the present invention provide a method of manufacturing a polyimide substrate, by which the polyimide substrate may be readily manufactured.

Exemplary embodiments of the present invention also provide a method of manufacturing a display device using the polyimide substrate, by which the display device may be readily manufactured.

Exemplary embodiments of the present invention provide a method of manufacturing a polyimide substrate.

An acid solution is provided to a glass substrate to remove a first cation included in the glass substrate, and a source solution including polyamic acid is provided to the glass substrate. Then, the polyamic acid is cured to form a polyimide substrate on the glass substrate, and the polyimide substrate is separated from the glass substrate.

In exemplary embodiments of the present invention, a method of manufacturing a display device is provided.

A polyimide substrate is formed on a glass substrate, and a plurality of pixels are formed on the polyimide substrate. The polyimide substrate including the plurality of pixels formed thereon is separated from the glass substrate.

The forming of the polyimide substrate is as follows. An acid solution is provided to the glass substrate to remove a first cation included in the glass substrate, and a source solution including polyamic acid is provided to the glass substrate. Then, the polyamic acid is cured.

BRIEF DESCRIPTION OF THE DRAWINGS

Exemplary embodiments of the present invention can be understood in more detail from the following detailed description taken in conjunction with the accompanying drawings in which.

DETAILED DESCRIPTION OF EXEMPLARY EMBODIMENTS

Figure 1A:
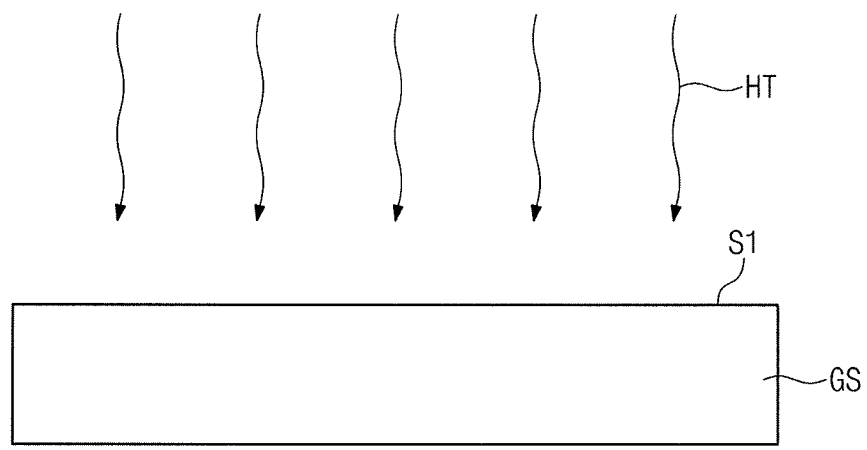
FIGS. 1A to 1F are diagrams illustrating a method of manufacturing a polyimide substrate according to an embodiment of the present invention.

Hereinafter, exemplary embodiments of the present invention will be described in detail with reference to the accompanying drawings. Exemplary embodiments of the present invention will be described below in more detail with reference to the accompanying drawings. Exemplary embodiments of the present invention may, however, be embodied in different forms and should not be construed as being limited to exemplary embodiments set forth herein. Like reference numerals refer to like elements throughout the specification. Also, in the drawings, the sizes and relative sizes of layers and regions may be exaggerated for clarity.

It will be understood that when a layer, region, or element is referred to as being "on," or "above" another layer, region, or element, it can be directly on, connected or coupled to the other layer, region, or element or an intervening layer, region, or elements may be present. As used herein, the term "and/or" includes any and all combinations of one or more of the associated listed items.

Also, as used herein, the singular forms, "a", "an" and "the" are intended to include the plural forms as well, unless the context clearly indicates otherwise.

FIGS. 1A to 1F are diagrams illustrating a method of manufacturing a polyimide substrate according to an embodiment of the present invention.

Referring to FIG. 1A, a heat treatment process is performed with respect to a glass substrate GS. Through the heat treatment process, the first cations (C1 in FIG. 2A) included in the glass substrate GS may move toward the upper surface S1 of the glass substrate GS. According to the material included in the glass substrate GS, the kind of the first cations (C1 in FIG. 2A) may vary. In an embodiment, the glass substrate GS may include, for example, silicon oxide, aluminum oxide, barium oxide, strontium oxide, calcium oxide, and magnesium oxide. In this case, the first cation (C1 in FIG. 2A) may include, for example, at least one of an aluminum cation, a barium cation, a strontium cation, a calcium cation, an iron cation, and a boron cation.

In an embodiment, the glass substrate GS is inserted into a heat treatment chamber and is provided with, for example, radiant heat HT, thereby performing the heat treatment process. Alternatively, in an embodiment, the heat treatment process with respect to the glass substrate GS may be performed by using, for example, a heating member included in a supporting member for supporting the glass substrate GS. For example, in an embodiment, the temperature of the heat treatment process may be from about 300° C. to about 600° C., and more particularly, the temperature of the heat treatment process may be from about 450° C. to about 550° C.

When a heat treatment process is performed with respect to the glass substrate GS prior to performing a leaching process with respect to the glass substrate GS as in the present embodiment, the first cations (C1 in FIG. 2A) may be leached out from the glass substrate GS during the leaching process more readily. However, exemplary embodiments of the present invention are not limited to the application of the heat treatment process. For example, alternatively in an embodiment, the heat treatment process may be omitted.

Figure 1B:
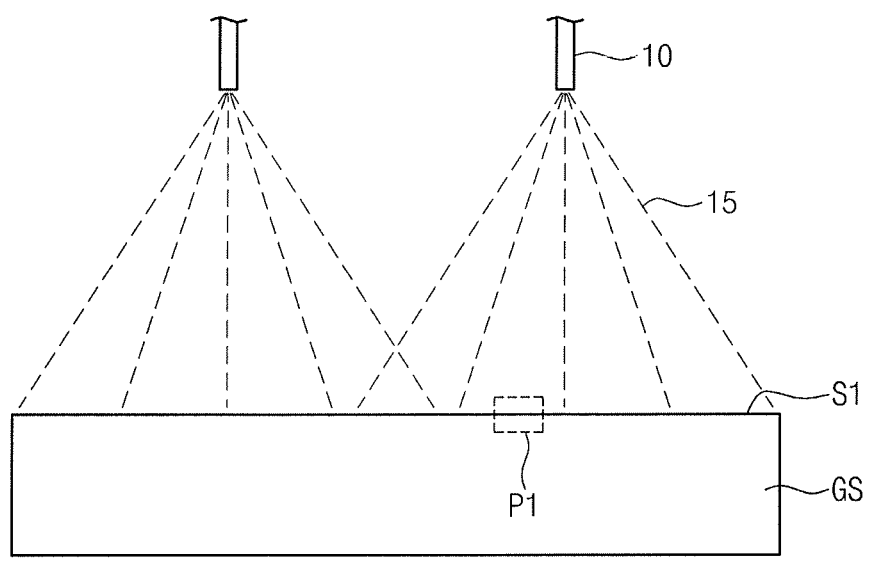

Referring to FIG. 1B, after performing the heat treatment process with respect to the glass substrate GS, an acid treatment is performed with respect to the glass substrate GS, thereby performing the leaching process. In an embodiment, an acid solution 15 may be provided to the glass substrate GS by using, for example, spraying members 10 disposed at the upper portion of the glass substrate GS, and the leaching process may be performed.

For example, in an embodiment, the acid solution 15 may include citric acid, and the leaching process may be performed for from about 10 minutes to about 60 minutes, and more particularly, for from about 15 minutes to about 35 minutes. Differently, when the leaching process is performed for less than about 10 minutes, the removing efficiency of the first cations (C1 in FIG. 2A) included in the glass substrate GS may be trivial. When the leaching process is performed for above about 60 minutes, the glass substrate GS may be etched by the acid solution 15.

In an embodiment, the acid solution 15 includes citric acid, but the acid solution 15 of exemplary embodiments of the present invention are not limited thereto. For example, the acid solution 15 may include another acid such as hydrochloric acid, or nitric acid. As the acidity of the acid solution 15 increases, the processing time of the leaching process decreases.

Figure 2A:
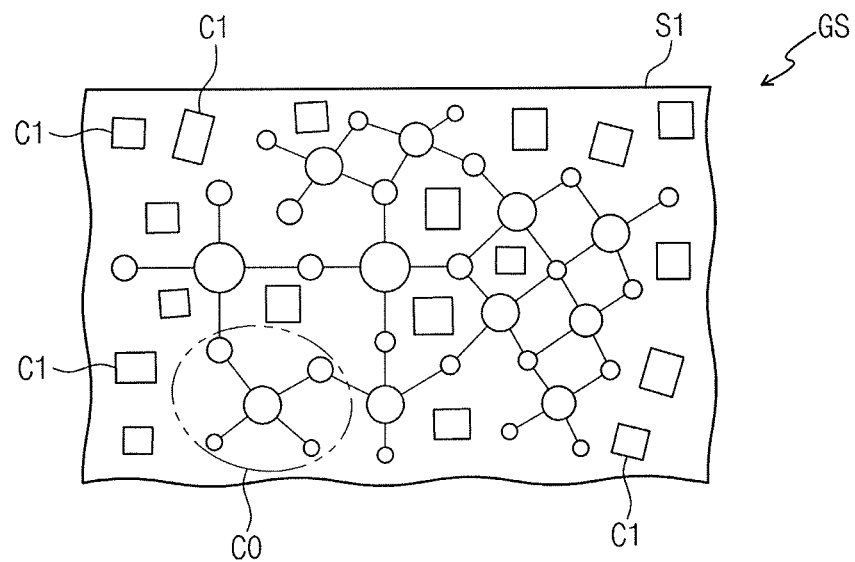
FIG. 2A is an enlarged view of the first part in FIG. 1B prior to performing a leaching process.
Figure 2B:
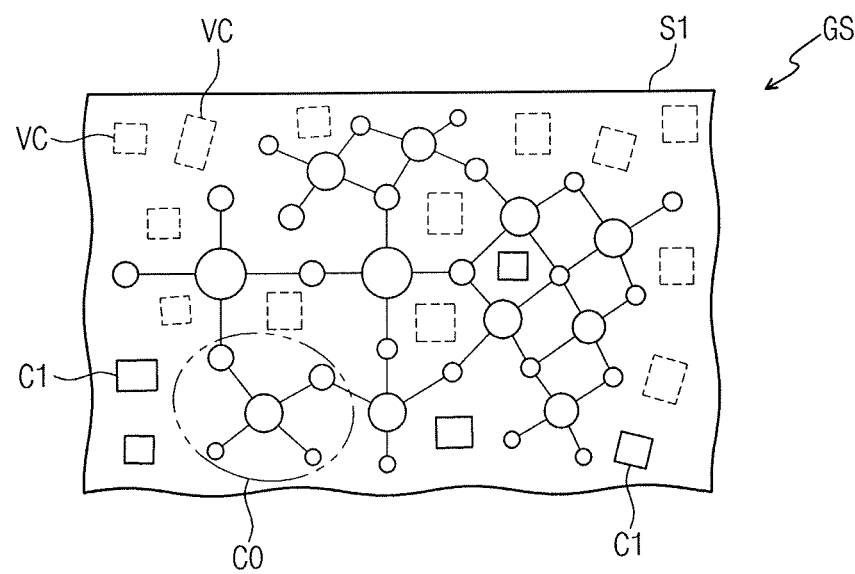
FIG. 2B is an enlarged view of the first part in FIG. 1B after completing a leaching process.
Figure 2C:
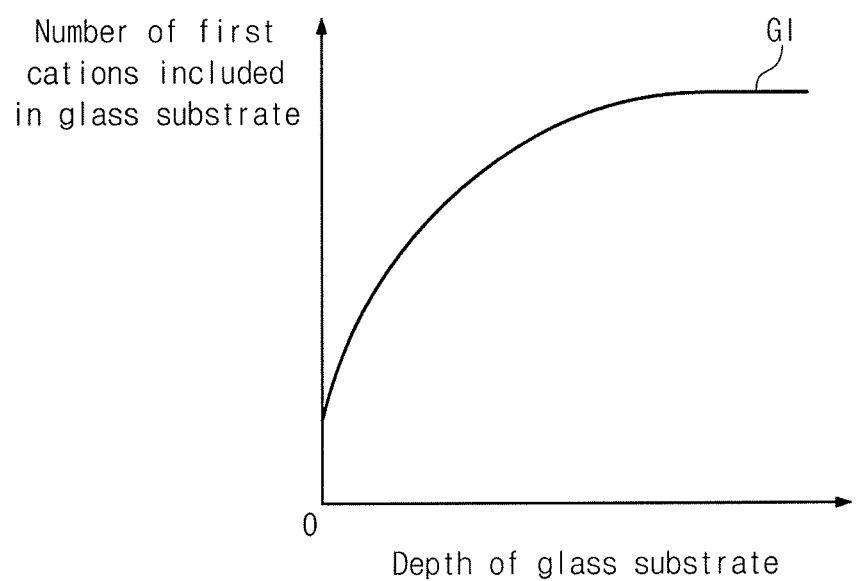
FIG. 2C is a graph illustrating the number of the first cations included in a glass substrate with respect to the depth of the glass substrate after completing a leaching process.

To explain the leaching process in more detail, FIGS. 2A, 2B, and 2C are referred to in addition to FIG. 1B.

FIG. 2A is an enlarged view of the first part in FIG. 1B prior to performing a leaching process, and FIG. 2B is an enlarged view of the first part in FIG. 1B after completing a leaching process. FIG. 2C is a graph illustrating the number of the first cations included in a glass substrate with respect to the depth of the glass substrate after completing a leaching process.

Referring to FIG. 2A, the glass substrate GS includes oxides C0 and the first cations C1 prior to performing the leaching process with respect to the glass substrate GS. The oxides C0 may include, for example, the silicon oxide. In an embodiment, the first cations C1 may be impurities included in the glass substrate GS, and the first cation C1 may include, for example, at least one of an aluminum cation, a barium cation, a strontium cation, a calcium cation, and an iron cation.

Referring to FIGS. 1B and 2B, when the leaching process is performed, the acid solution 15 is provided to, for example, the upper surface S1 of the glass substrate GS, and the first cations C1 positioned adjacent to the upper surface S1 among the first cations C1 may be removed by the acid solution 15. When the leaching process is finished, the first cations C1 may be removed, and vacancies VC may be formed in the glass substrate GS.

During performing the leaching process, the acid solution 15 is provided to, for example, the upper surface S1 of the glass substrate GS and is penetrated into the glass substrate GS along the thickness direction of the glass substrate GS. When considering the penetrating direction of the acid solution 15 and the mechanism concerning the generation of the vacancies VC through the removal of the first cations C1 by the acid solution 15, the number of the first cations C1 is the smallest at the upper surface S1 in the glass substrate GS, and the number of the first cations C1 may be approximately increased as the depth of the glass substrate GS increases, as illustrated in the first graph GI in FIG. 2C. As the leaching process is performed for from about 10 minutes to about 60 minutes in the present embodiment, the number of the first cations C1 may become constant when the depth of the glass substrate GS becomes a certain value and above.

Figure 1C:
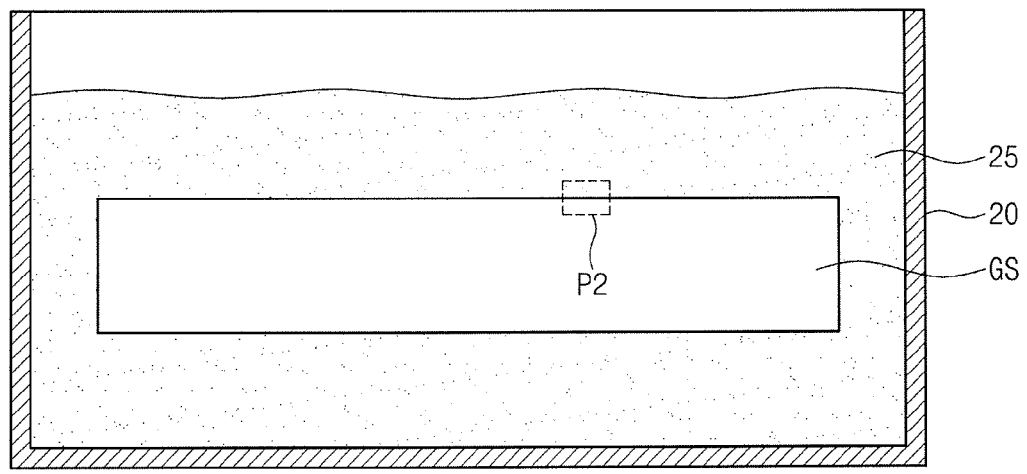

Referring to FIG. 1C, a container 20 holding a solution 25 containing the second cation is prepared, and the glass substrate GS which was subjected to the leaching process is impregnated with the solution 25. Then, the plurality of vacancies (VC in FIG. 2B) formed in the glass substrate GS by the leaching process may be filled with the second cations (C2 in FIG. 3).

In an embodiment, the second cation may be, for example, a magnesium cation. Therefore, the solution 25 may be prepared by dissolving a material such as, for example, magnesium chloride, magnesium gluconate, magnesium acetate, magnesium citrate, magnesium bromide, and magnesium sulfate in a solvent.

The process illustrated in FIG. 1 will be described in more detail referring to FIG. 3.

Figure 3:
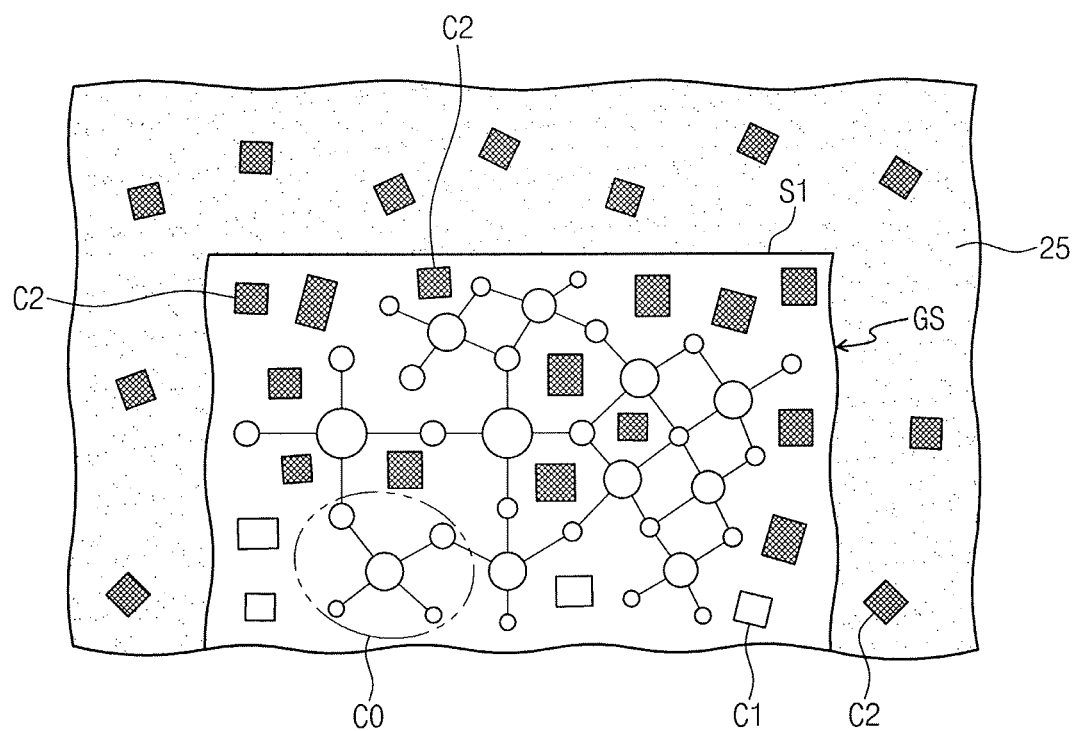
FIG. 3 is an enlarged view of the second part in FIG. 1C.

FIG. 3 is an enlarged view of the second part in FIG. 1C.

Referring to FIG. 3, when the glass substrate GS is impregnated with the solution 25, the plurality of vacancies VC formed in the glass substrate GS by the leaching process may be filled with the second cations C2. In addition, most of the plurality of vacancies VC are formed adjacent to the upper surface S1 of the glass substrate GS. The plurality of vacancies VC formed adjacent to the upper surface S1 may be filled with the second cations C2, and a surface treatment process with respect to the upper surface S1 may be performed. Thus, after performing the surface treatment process, rather than prior to performing the surface treatment process, the concentration of the second cations C2 and an oxide including the second cations C2 at the upper surface S1 may be increased.

In an embodiment, the glass substrate GS is impregnated with the solution 25, and the surface treatment is performed. However, exemplary embodiments of the present invention are not limited to the method of the surface treatment described above. Rather, another surface treatment process will be explained referring to, for example, FIGS. 4A and 4B which is also in accordance with exemplary embodiments of the present invention.

Figure 4A:
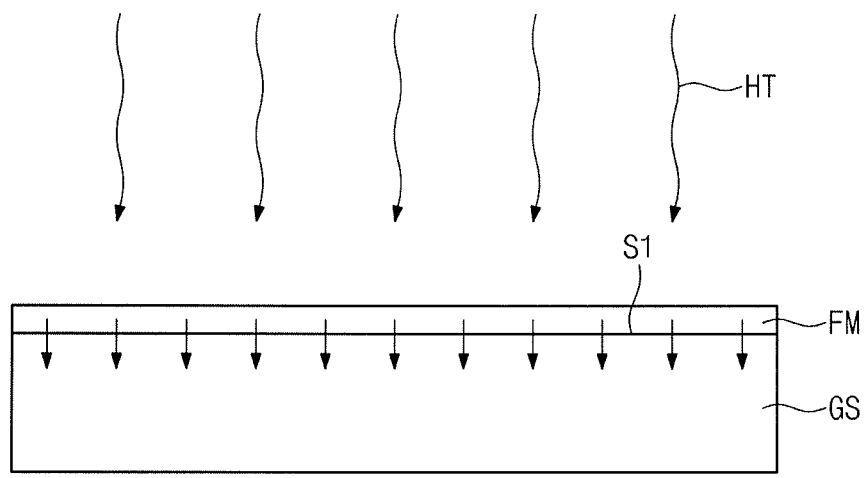
FIGS. 4A and 4B are diagrams illustrating a method of surface treatment of a glass substrate according to an embodiment of the present invention.
Figure 4B:
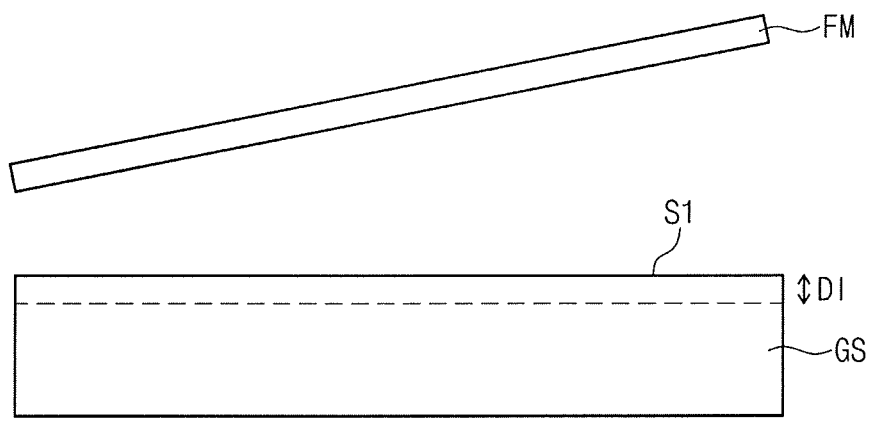

FIGS. 4A and 4B are diagrams illustrating a method of surface treatment of a glass substrate according to an embodiment of the present invention.

Referring to FIGS. 4A and 4B, after performing the leaching process with respect to the glass substrate GS as explained referring to FIG. 1B, a thin film FM is formed on the upper surface S1 of the glass substrate GS. The thin film FM includes, for example, the second cation (C2 in FIG. 3), and in the present embodiment, the thin film FM may include, for example, magnesium or magnesium oxide.

In an embodiment, the thin film FM may be formed on the glass substrate GS by, for example, using a deposition method such as a sputtering method and a chemical vapor deposition method. The thin film FM may be formed to a thickness of, for example, from about 10 angstroms to about 100 angstroms.

After forming the thin film FM on the glass substrate GS, the glass substrate GS including the thin film FM formed thereon is heated. Then, the second cations (C2 in FIG. 3) included in the thin film FM are diffused from the upper surface S1 to the glass substrate GS to a first depth D1 in the glass substrate GS. Through the diffusion of the second cations (C2 in FIG. 3), the surface treatment process with respect to the upper surface S1 of the glass substrate GS may be performed, and the concentration of the magnesium cation and the magnesium oxide may be increased at the upper surface S1 by the surface treatment process.

After that, the thin film FM is separated from the glass substrate GS, and the surface treatment process with respect to the glass substrate GS may be completed.

Figure 1D:
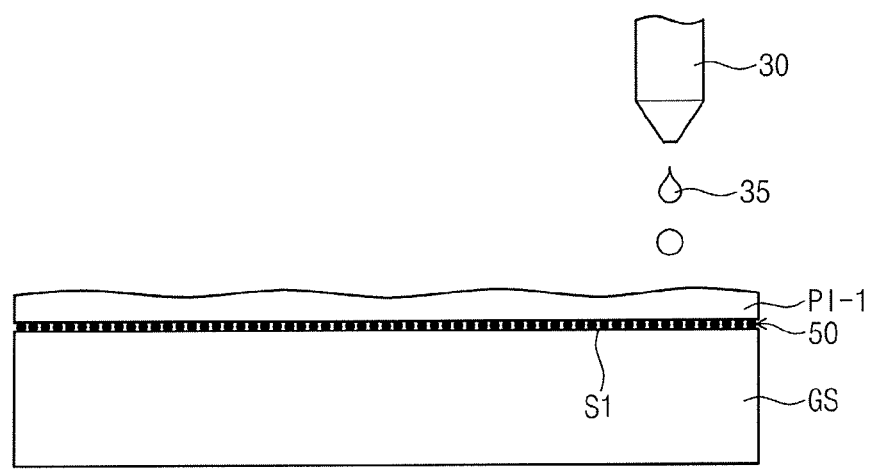
Figure 1E:
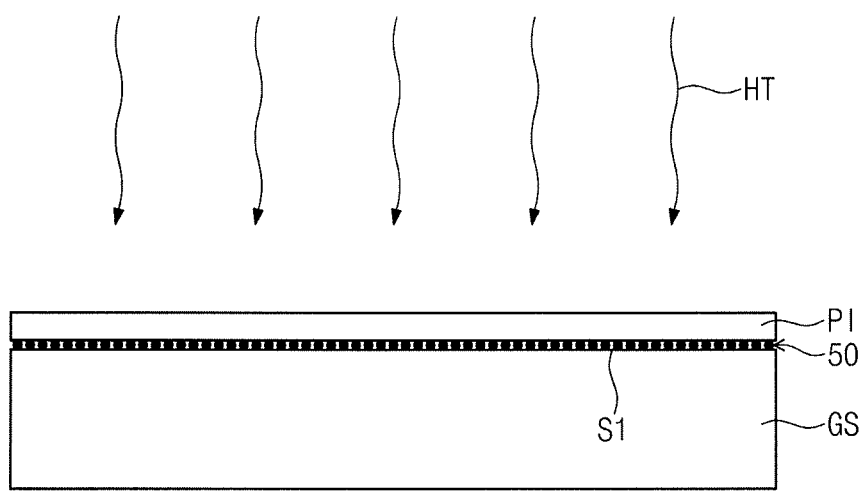

Referring to FIGS. 1D, 1E, and 3, a source solution 35 including, for example, polyamic acid is provided on the glass substrate GS which was subjected to the leaching process and the surface treatment process one by one, and a preliminary polyimide layer PI-1 is formed. In an embodiment, the source solution 35 may be provided on the glass substrate GS by using, for example, a nozzle 30. Then, heat HT is applied to the preliminary polyimide layer PI-1 to cure the preliminary polyimide layer PI-1 to thereby form a polyimide substrate PI.

When the second cation C2 is the magnesium cation as described above, and when the preliminary polyimide layer PI-1 is formed on the glass substrate GS in which the concentration of the magnesium cation is increased at the upper surface S1 of the glass substrate GS by the surface treatment process, an acid-base reaction may occur between the magnesium cation and the polyamic acid. Through the acid-base reaction, a salt 50 is formed. The salt 50 is formed on the upper surface S1 and disposed between the glass substrate GS and the preliminary polyimide layer PI-1.

As described above, in an embodiment, the second cation C2 may tend to conduct the acid-base reaction with the polyamic acid but the first cation C1 such as the aluminum cation, the barium cation, the strontium cation, the calcium cation, the iron cation, and the boron cation may tend to form a covalent bond rather than the acid-base reaction with the polyamic acid. In this case, the salt 50 produced on the upper surface S1 may inhibit a covalent bond from being formed between the first cation C1 and the polyamic acid, and the number of the first cations C1 forming the covalent bond with the polyamic acid may be decreased by the salt 50. When considering the binding force between the polyimide substrate PI and the glass substrate GS, the intensity of the binding force is proportional to the number of the first cations C1 forming the covalent bond with the polyamic acid. Thus, the binding force between the polyimide substrate PI and the glass substrate GS may be decreased due to the salt 50.

Figure 1F:
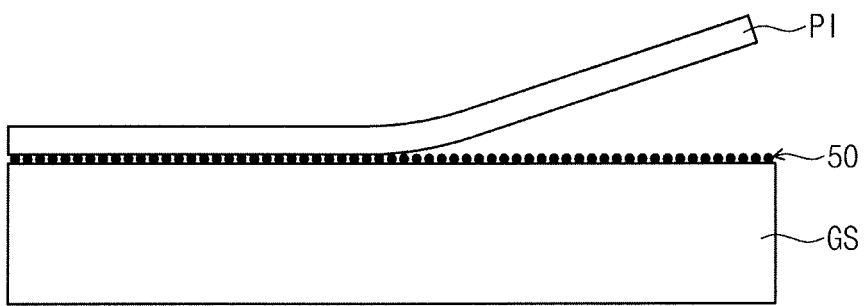

Referring to FIG. 1F, the polyimide substrate PI is separated from the glass substrate GS, and the manufacture of the polyimide substrate PI is completed. When separating the polyimide substrate PI from the glass substrate GS, as the binding force between the glass substrate GS and the polyimide substrate PI is decreased due to the salt 50, the polyimide substrate PI may be readily separated from the glass substrate GS.

Different from an embodiment of the present invention, when the leaching process and the surface treatment process are not performed with respect to the glass substrate GS, a strength from about 78 gf/inch to about 120 gf/inch may be necessary to separate the polyimide substrate PI from the glass substrate GS. However, according to an embodiment of the present invention, as illustrated in the following Table 1, the strength which may be necessary to separate the polyimide substrate PI from the glass substrate GS may be decreased.

TABLE 1

| Peeled part from polyimide substrate | Peeling strength |
| --- | --- |
| Edge | 13.62 gf/inch |
| Edge | 15.50 gf/inch |
| Center | 14.44 gf/inch |
| Center | 15.75 gf/inch |
| Mean | 14.83 gf/inch |

As illustrated in the above Table 1, the peeling strength may be largely decreased according to an embodiment of the present invention, and an additional process such as, for example, a laser exposing process to separate the polyimide substrate PI from the glass substrate GS is not necessary.

In the method explained referring to FIGS. 1A to 1F, the binding force between the glass substrate GS and the polyimide substrate PI may be decreased by performing the leaching process and the surface treatment process one by one with respect to the glass substrate GS. However, alternatively in an embodiment, the surface treatment process may be omitted. When the surface treatment process is omitted, the salt 50 may not be formed between the polyimide substrate PI and the glass substrate GS. However, the number of the first cations (C1 in FIG. 3) of the glass substrate GS, forming a covalent bond with the polyamic acid through the leaching process may be decreased, and the binding force between the glass substrate GS and the polyimide substrate PI may be decreased.

Figure 5A:
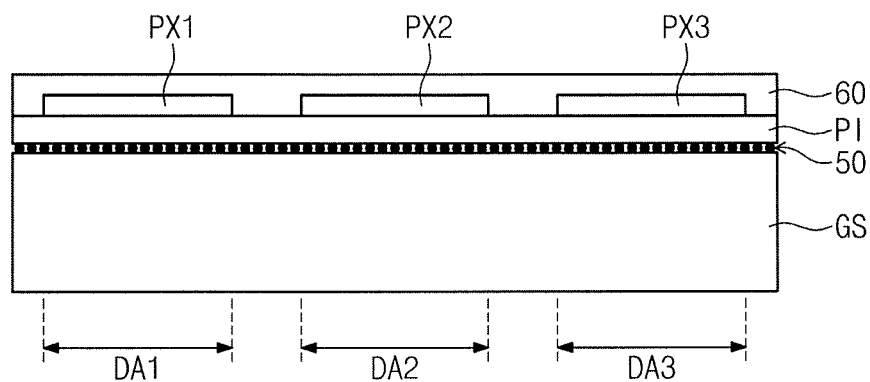
FIGS. 5A and 5B are diagrams illustrating a method of manufacturing a display device according to an embodiment of the present invention.
Figure 5B:
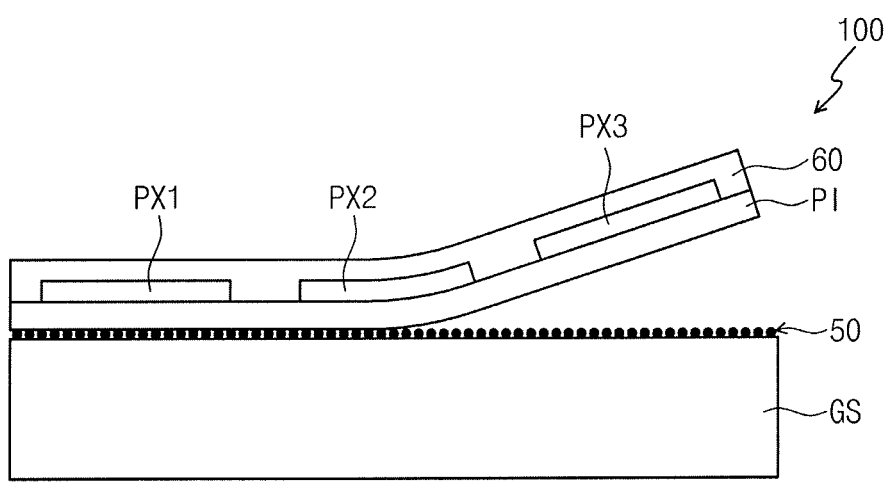

FIGS. 5A and 5B are diagrams illustrating a method of manufacturing a display device according to an embodiment of the present invention.

According to the method explained referring to FIGS. 1A to 1E, a polyimide substrate PI is formed on a glass substrate GS. A salt 50 is formed between the glass substrate GS and the polyimide substrate PI.

Referring to FIG. 5A, a plurality of pixels are formed on the polyimide substrate PI, and an encapsulation layer 60 covering the plurality of pixels is formed. In an embodiment, the polyimide substrate PI includes, for example, a first display area DA1, a second display area DA2, and a third display area DA3. In this case, first pixels PX1, second pixels PX2, and third pixels PX3 may be formed, for example, in the first to third display areas DA1, DA2, and DA3 by one to one correspondence.

In the present embodiment, the first to third pixels PX1, PX2, and PX3 may include, for example, pixels included in an organic electroluminescence display device. However, exemplary embodiments of the present invention are not limited to the structure of the first to third pixels PX1, PX2, and PX3. For example, alternatively, in an embodiment, pixel electrodes of an array substrate for a liquid crystal display device may be used as the first to third pixels PX1, PX2, and PX3.

Referring to FIG. 5B, the polyimide substrate PI including the first to third pixels PX1, PX2, and PX3 formed thereon is separated from the glass substrate GS. Then, a display device 100 including the polyimide substrate PI as a base substrate is manufactured.

When separating the polyimide substrate PI from the glass substrate GS, the binding force between the glass substrate GS and the polyimide substrate PI may be decreased due to the salt 50 as described above. Therefore, the polyimide substrate PI may be readily separated from the glass substrate GS.

Having described exemplary embodiments of the present invention, it is further noted that it is readily apparent to those of ordinary skill in the art that various modifications may be made without departing from the spirit and scope of the invention which is defined by the metes and bounds of the appended claims.

What is claimed is:

1. A method of manufacturing a polyimide substrate, comprising:
    providing an acid solution to a glass substrate to remove a first cation included in the glass substrate;
    filling vacancies left in the glass substrate, by the removal of the first cation, with a second cation;
    providing a source solution including polyamic acid to the glass substrate;
    curing the polyamic acid to form a polyimide substrate on the glass substrate; and
    separating the polyimide substrate from the glass substrate.

2. The method of claim 1, wherein the acid solution is provided on an upper surface of the glass substrate, and wherein the polyamic acid is provided on the upper surface of the glass substrate to form the polyimide substrate on the upper surface of the glass substrate.

3. The method of claim 1, wherein the first cation is combined with the material included in the source solution to have a first binding force combining the polyimide substrate with the glass substrate, and
    wherein a chemical bonding degree between the first cation and a material included in the source solution is decreased due to the removal of the first cation so that the first binding force is decreased.

4. The method of claim 3, wherein the second cation forms a chemical bond with the material included in the source solution to produce a salt between the polyimide substrate and the glass substrate, and wherein the first binding force is decreased due to the salt.

5. The method of claim 4, wherein the first cation comprises at least one selected from the group consisting of an aluminum cation, a barium cation, a strontium cation, a calcium cation, an iron cation and a boron cation, and wherein the second cation comprises a magnesium cation.

6. The method of claim 4, wherein the glass substrate is impregnated with a solution including the second cation, thereby providing the second cation in the vacancy.

7. The method of claim 6, wherein the glass substrate is impregnated with the solution for from about 10 minutes to about 60 minutes.

8. The method of claim 4, further comprising forming a thin film on the glass substrate, wherein the second cation is diffused from the thin film to the vacancy.

9. The method of claim 2, further comprising prior to the removing of the first cation, performing a heat treatment with respect to the glass substrate, wherein the first cation moves toward the upper surface of the glass substrate by the heat treatment.

10. The method of claim 1, wherein the acid solution comprises citric acid.

11. A method of manufacturing a display device, the method comprising:
    forming a polyimide substrate on a glass substrate;
    forming a plurality of pixels on the polyimide substrate; and
    separating the polyimide substrate including the plurality of pixels formed thereon from the glass substrate,
    wherein the forming of the polyimide substrate comprises: providing an acid solution to the glass substrate to remove a first cation included in the glass substrate, filling vacancies left in the glass substrate, by the removal of the first cation, with a second cation, providing a source solution including polyamic acid to the glass substrate, and curing the polyamic acid.

12. The method of claim 11, wherein the acid solution is provided on an upper surface of the glass substrate, and wherein the polyamic acid is provided on the upper surface of the glass substrate to form the polyimide substrate on the upper surface of the glass substrate.

13. The method of claim 11, wherein the first cation is combined with the material included in the source solution to have a first binding force combining the polyimide substrate with the glass substrate, and
    wherein a chemical bonding degree between the first cation and a material included in the source solution is decreased due to the removal of the first cation so that the first binding force is decreased.

14. The method of claim 13, wherein the second cation forms a chemical bond with the material included in the source solution to produce a salt between the polyimide substrate and the glass substrate, and wherein the first binding force is decreased due to the salt.

15. The method of claim 14, wherein the first cation comprises at least one selected from the group consisting of an aluminum cation, a barium cation, a strontium cation, a calcium cation, an iron cation, and a boron cation, and wherein the second cation comprises a magnesium cation.

16. The method of claim 14, wherein the glass substrate is impregnated with a solution containing the second cation, thereby providing the second cation in the vacancy.

17. The method of claim 16, wherein the glass substrate is impregnated with the solution for from about 10 minutes to about 60 minutes.

18. The method of claim 14, further comprising forming a thin film on the glass substrate, wherein the second cation is diffused from the thin film to the vacancy.

19. The method of claim 12, further comprising prior to the removing of the first cation, performing a heat treatment with respect to the glass substrate, wherein the first cation moves toward the upper surface of the glass substrate by the heat treatment.

20. The method of claim 11, wherein the acid solution comprises citric acid.

* * * * *